(12) United States Patent
Garner et al.

(10) Patent No.: US 9,743,638 B2
(45) Date of Patent: Aug. 29, 2017

(54) NESTING MATERIAL BALING AND DISPENSING SYSTEM FOR MOUSE ENVIRONMENTAL ENRICHMENT

(75) Inventors: Joseph P. Garner, Brisbane, CA (US); Amy C. Lossie, Rockville, MD (US)

(73) Assignee: Purdue Research Foundation, West Lafayette, IN (US)

( * ) Notice: Subject to any disclaimer, the term of this patent is extended or adjusted under 35 U.S.C. 154(b) by 478 days.

(21) Appl. No.: 14/236,482

(22) PCT Filed: Aug. 2, 2012

(86) PCT No.: PCT/US2012/049254
§ 371 (c)(1),
(2), (4) Date: Apr. 23, 2014

(87) PCT Pub. No.: WO2013/019916
PCT Pub. Date: Feb. 7, 2013

(65) Prior Publication Data
US 2014/0238306 A1    Aug. 28, 2014

Related U.S. Application Data

(60) Provisional application No. 61/514,094, filed on Aug. 2, 2011.

(51) Int. Cl.
*A01K 29/00* (2006.01)
*A01K 1/015* (2006.01)
*B65B 27/12* (2006.01)
*B65B 55/12* (2006.01)

(52) U.S. Cl.
CPC .......... *A01K 1/0155* (2013.01); *A01K 1/0152* (2013.01); *B65B 27/12* (2013.01); *B65B 55/12* (2013.01)

(58) Field of Classification Search
CPC ..... A01K 1/0155; A01K 1/0152; A01K 1/015
USPC ...... 119/172, 171, 28.5, 471, 526, 479, 347, 119/161, 174
See application file for complete search history.

(56) References Cited

U.S. PATENT DOCUMENTS

| | | | | |
|---|---|---|---|---|
| 1,610,285 A | * | 12/1926 | Hodge | B65D 5/60 119/329 |
| 2,340,256 A | * | 1/1944 | Weil | A01M 1/14 43/131 |
| 2,904,003 A | * | 9/1959 | Bernard | A01K 31/16 119/347 |
| 3,037,480 A | * | 6/1962 | De Silva | A01K 1/035 119/161 |
| 4,444,148 A | | 4/1984 | Lander | |
| 4,619,862 A | * | 10/1986 | Sokolowski | A01K 1/0152 119/172 |

(Continued)

OTHER PUBLICATIONS

PCT/US2012/049254, International Search Report, Feb. 15, 2013, 10 pp.

*Primary Examiner* — Kristen C Hayes
(74) *Attorney, Agent, or Firm* — Brinks Gilson & Lione

(57) ABSTRACT

A standardized nesting material for use in laboratory environments for rodents includes a latrining substrate, and at least one bale unit formed to include a fibrous scaffolding material, and an insulating material. The bale units are of standardized size and can be packaged and sterilized to provide improved wellbeing of the animals; reduced feed and labor costs; and improved scientific quality of the studies conducted on the animals.

10 Claims, 7 Drawing Sheets

(56) References Cited

U.S. PATENT DOCUMENTS

| | | | | |
|---|---|---|---|---|
| 4,662,104 A | * | 5/1987 | Mather | A01K 1/0152 43/124 |
| 5,002,014 A | * | 3/1991 | Albin | A01K 1/0353 119/28.5 |
| 5,423,290 A | * | 6/1995 | Payne | A01K 31/14 119/329 |
| 6,584,934 B1 | | 7/2003 | Willan | |
| 8,181,602 B2 | * | 5/2012 | Gauthier | A01K 1/0155 119/172 |
| 8,205,576 B2 | * | 6/2012 | Theis | A01K 1/0155 119/171 |
| 9,043,991 B2 | * | 6/2015 | Simon | A01K 1/0353 |
| 2008/0110404 A1 | * | 5/2008 | Theis | A01K 1/0155 119/172 |
| 2008/0134982 A1 | * | 6/2008 | Thormodsgaard | A01K 1/0155 119/172 |
| 2009/0074703 A1 | * | 3/2009 | Jewell | A01K 1/0155 424/76.1 |
| 2010/0192867 A1 | * | 8/2010 | Gauthier | A01K 1/0155 119/172 |

* cited by examiner

NESTING MATERIAL BALING AND DISPENSING SYSTEM FOR MOUSE ENVIRONMENTAL ENRICHMENT

CROSS-REFERENCE TO RELATED APPLICATIONS

This application is a 371 nationalization of PCT/US2012/049254, filed Aug. 2, 2012, which in turn claims benefit of U.S. Provisional Application Ser. No. 61/514,094 filed Aug. 2, 2011.

BACKGROUND

1. Field of the Disclosure

The present disclosure generally relates to laboratory animal husbandry, bedding, and enrichment; particularly the automation and manufacture thereof; particularly for rodents.

2. Description of the Prior Art

Nesting material has been identified as the best 'environmental enrichment' for improving animal wellbeing, health, productivity, and scientific data quality in mice. Existing nesting enrichments are either easily dispensed, but are unsuitable for building nests (and are generally ignored by mice); or allow good nest-building, but are very difficult to handle and cannot be automatically dispensed. Given the need of automation in the industrial scale of mouse husbandry, current mouse enrichment is largely limited to nesting enrichments that mice don't use, or enrichments such as shelters which can be detrimental to mouse wellbeing.

The known environmental enrichments are additions to husbandry that allow animals to cope with stressors and challenges in the captive environment (Olsson & Dahlborn 2002; Garner 2005; Würbel & Garner 2007). As a result of reduced psychological and physiological stress, enrichments improve the wellbeing, comfort, health, and productivity, of animals; and in the case of lab animals, improve the quality and validity of data they yield. (Benaroya-Milshtein et al. 2004; Garner 2005; Benaroya-Milshtein et al. 2007; Würbel & Garner 2007). Accordingly enrichment is now generally required for laboratory animals in the US (Institute of Laboratory Animal Resources (ILAR) 2010).

In the case of mice, nesting material has emerged as the most effective enrichment in terms of mouse wellbeing (Olsson & Dahlborn 2002). Other enrichments, particularly shelters, are widely used (e.g. www.bio-serv.com). However shelters, in particular, often induce territoriality and aggression, and so can inadvertently introduce stress, impair wellbeing, and increase the variability of animals (Barnard et al, 1996; Olsson & Dahlborn 2002; Howerton et al. 2008). Shelters induce aggression in part because they are highly valued, so while they are of benefit to singly housed mice; they are a liability for group housed animals. However they are a specific case of a more general issue—which is that just because a cage looks enriched to humans, doesn't mean that it is to an animal. In fact the vast majority of commercially available mouse enrichments have never been studied scientifically to assess their efficacy or whether they might have unexpected consequences. Another excellent example can be found in mouse nesting enrichments. Until recently the predominant nesting enrichment was the 'Nestlet', a square of compressed cotton that can, in theory, be shredded by the mouse to make a nest. However mice often fail to make use of Nestlets; and in fact mice provided with Nestlets build no better nests than mice provided with an equal weight of additional bedding (Hess et al. 2008).

Mice in the wild build nests by weaving fibrous materials (such as grass, or straw) into a compact and rigid scaffolding, to hold layers of insulating softer materials. Mice process nesting materials extensively to generate the properties required. Thus, when preparing 'scaffolding' materials they chew along the material fraying out individual fibers to aid adhesion when the materials are eventually woven together. Similarly, they chew and fray insulating and lining materials into an expanded 'fluff' (Van Oortmerssen 1971; Latham & Mason 2004). Thus while Nestlets may provide a suitable material for these inner layers, they are useless without a suitable structural material. Accordingly, when Nestlets are compared against a shredded paper product that does allow the construction of a 'scaffolding' mice build far better nests with this alternative material ('Eco-bedding', www.fibercorelle.com) (Hess et al. 2008). Furthermore, when provided with a mix of Eco-bedding and tissue paper, mice use the Ecobedding to build a scaffold, and line the nest with tissue paper (Hess et al. 2008).

Nests probably benefit mice in captivity for two reasons. First, like shelters, they probably serve a psychological function as a place of refuge from the perceived threats of predation inherent in the close interaction of mice with their human caretakers. Second, work in our lab has shown that mice are cold stressed under normal laboratory conditions, that mice adjust nest structure to ambient temperature (building better nests in colder temperatures), that nests (built with Eco-bedding) reduce radiative heat loss by about 5° C., and that feed conversion (the weight of food eaten per g of body weight gained) is reduced up to 5-fold (unpublished data, and: Gaskill et al. 2009a; Gaskill et al. 2009b). Thus mice without nests are metabolically, physiologically, and behaviorally abnormal—with consequences (aside from the massive increase in food consumption) including effects on body composition, growth and reproduction, and metabolically dependent processes such as pharmacodynamics. Aside from the obvious scientific benefits, food is one of the major costs in mouse housing.

However, the complex nature of nest-building behavior, and the complex mixture of materials it requires, presents three key challenges to providing nesting material which have limited its adoption in the industry:
a) Identifying a material that mice can and will use effectively to build nests;
b) Ease of handling, standardization of the amount of material provided, and automation of cage provisioning; and
c) Unintended negative consequences, particularly poor ammonia control, and difficulties in cage cleaning.

Existing materials represent a poor trade-off between these concerns. As outlined above, Nestlets, are standardized and easily handled, but are a very poor nest-building material, and are often ignored by mice. Eco-bedding, allows mice to build excellent nests, but is hard to handle and standardize (it is typically loose-packed in bulk and must be measured and dispensed by hand), and can present difficulties in cage cleaning (particularly because it can clog older vacuum systems used in large facilities). Mice can build surprisingly good nests with pine shavings, given enough time to process the material, but pine shavings are a notoriously poor choice for ammonia control. In fact, driven largely by concerns over ammonia control, the industry is generally moving towards bedding materials that provide less thermal and physical comfort (such as corn-cob), further magnifying the need for a suitable nesting enrichment.

Cage cleaning problems are limited to well-understood defects in vacuum system design (e.g. narrow tube diameter, tight tube corners, and long tube runs), are readily solved, and are not addressed here[j1]. Ideal materials have already been identified—namely long shredded paper strips, potentially combined with other softer materials such as facial tissue paper (referred to as 'tissue paper' herein).

There is therefore an unsatisfied need for the handling, standardization and dispensing of nesting material on an industrial scale.

SUMMARY

To solve these problems the invention: 1) Implements optimal nest-building materials (a minimum of long strips of shredded paper or other fibrous 'scaffolding' material, potentially with the addition of softer insulating materials such as tissue paper); 2) Adapts traditional 'baling' technology, as used for nearly a hundred years in agricultural equipment to produce standardized and easily handled bales of nesting material; 3) Optionally combines the automated dispensing of bales of nesting material with automated bedding dispensing technology already used in large scale mouse husbandry systems e.g. www.geneva-scientific.com.

In one aspect, rotating tines or a conveyer can feed the primary fibrous material into a baler. Secondary 'thermal materials' may be introduced and mixed at this stage. In a 'rolled' baler implementation this material is fed directly into a circular chamber enclosed on at least one side by rotating belts or drums which can roll and compress the material into a cylinder, before ejecting the bale. Secondary thermal materials (e.g. a sheet of tissue paper) may be wrapped around the bale prior to ejection to bind it (with or without adhesive).

In another aspect using a 'packed' or 'linear' baler, the material can be fed into a chamber by an augur, belt and/or reciprocating tines, and may be compressed by a plunger (which can also cut any straggling material). Again the material may be bound with a wrapping of secondary thermal material during the ejection process.

In yet alternative aspects, the implementations might involve twisting the material to form a loose rope, or rolling it to form balls. In all implementations, the amount of material, and compression of the bale is controlled.

In yet another aspect, in the mouse facility, the bales can be dispensed (e.g. by conveyer, or pneumatic tube) along with bedding or latrine material (e.g. corncob, pine shavings) into clean cages either by hand, or on an automated 'assembly' line.

One feature is the process, equipment and end product whereby a fibrous material (e.g. shredded paper) is formed into bales for use as nesting material for mice or other (laboratory animals). For mice, such bales can be formed to be roughly 8-12 g, and roughly 1-4 cubic inches depending on the selected mass and density.

One advantage is the bales have two desirable properties—the use of fibrous material that can form the scaffolding of a nest; and sufficient integrity that they can be packaged, sterilized, and dispensed automatically without falling apart.

As a result of these various features, the mice benefit by provision of an optimal enrichment. The husbandry facilities benefit by reduced labor, improved animal health and productivity, and reduced feed costs (due to improved thermoregulation). End-user researchers benefit by reduced housing costs, improved mouse health and wellbeing, and improved data quality.

Other features and advantages will become apparent to those skilled in the art from the following disclosure of preferred embodiments exemplifying the best mode of practicing the invention. The following disclosure references the accompanying drawings illustrating the preferred embodiments.

DESCRIPTION OF PREFERRED EMBODIMENTS

Figure 1A:
FIG. 1a is an example of a wild mouse nest (from www.arkive.org)—note the use of structural scaffolding, and the interleaving of other materials.
Figure 1B:
FIG. 1b is an example of laboratory mouse nest-building when given a mixture of a scaffolding material (Ecobedding) and a lining material (Facial tissue paper) from (Hess et al. 2008).
Figure 2:
FIG. 2 is an example the raw materials used. To the right is an example 'scaffolding' material of shredded paper. To the left are example secondary 'comfort' materials that might be mixed into the bale. In this case 'Enrich-n' Nest' or small twisted pieces of paper (two are unrolled to the bottom right). The scale is in cm.
Figure 3A:
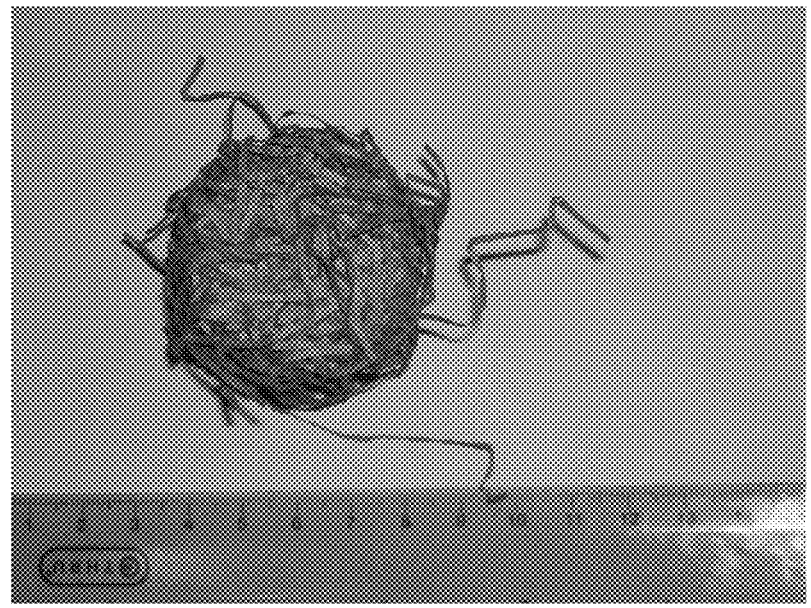
FIG. 3a is a top view of a 'rolled' bale formed by rolling the scaffolding material in a confined chamber. The scale is in cm.
Figure 3B:
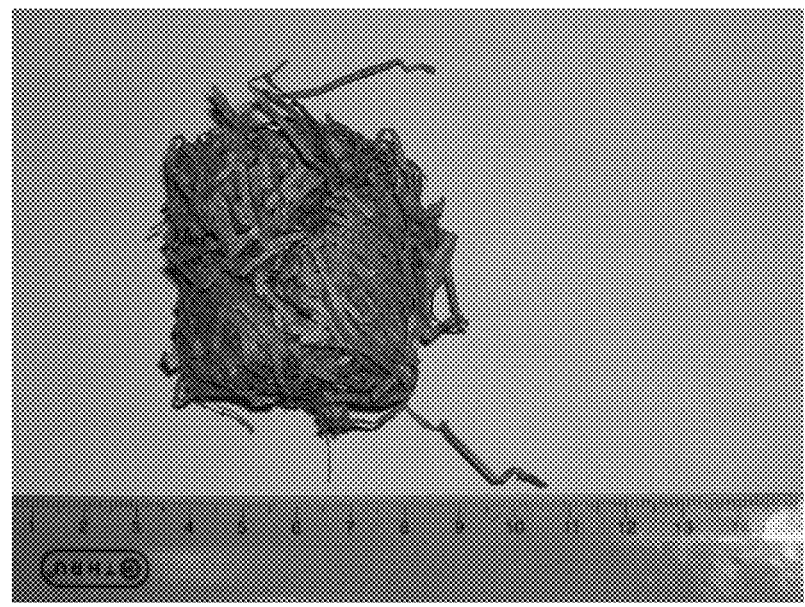
FIG. 3b is a side elevation view of the rolled bale shown in FIG. 3a. The scale is in cm.
Figure 3C:
FIG. 3c is a top view of a 'rolled' bale wrapped in six layers of tissue paper formed by rolling the scaffolding material in a confined chamber. The scale is in cm.
Figure 3D:
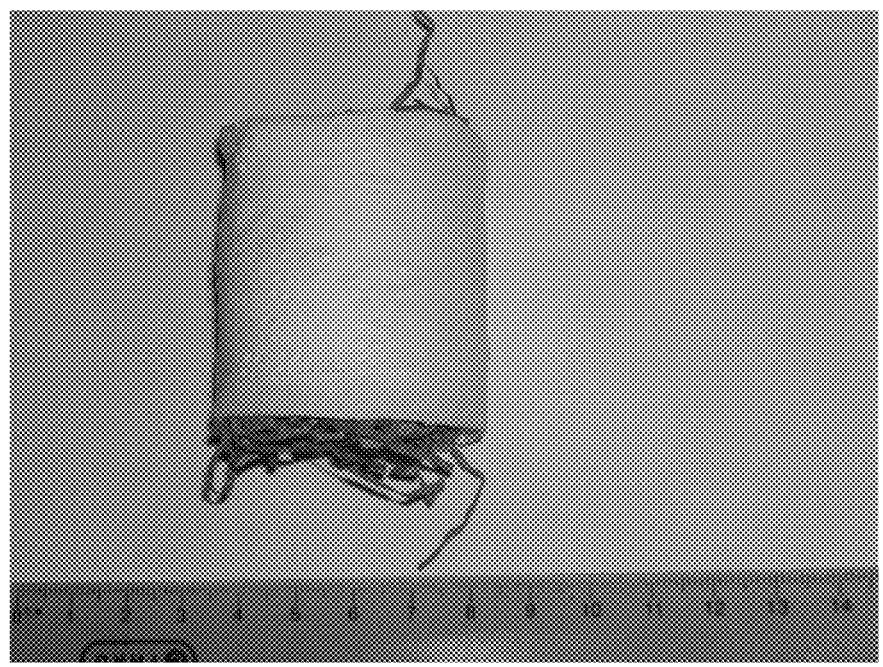
FIG. 3d is a side elevation view of the rolled bale shown in FIG. 3c. The scale is in cm.

As discussed above, nesting material is the ideal enrichment for mice. However, ideal nesting materials cannot currently be easily dispensed or standardized, and existing easily dispensable standardized nesting materials (Nestlets) are extremely poorly suited for mouse nest-building. This invention solves these immediate problems. The immediate benefits are: improved wellbeing of the animals; reduced feed and labor costs; and improved scientific quality. Furthermore, by providing a standardized nesting material, this invention allows a division of labor that has limited existing animal bedding. In that bedding serves two purposes: it provides a latrine substrate to absorb moisture and control ammonia and micro-organisms; and it provides physical and thermal comfort. Typically, the better a material is at one, the worse it is at another. Thus, by providing an ideal material for physical and thermal comfort, cages can now be bedded with an ideal material for latrining (such as corn-cob), achieving the best of both worlds.

The bales may be formed by a variety of methods. Agricultural balers fall into two generic designs—'rolling' or 'rotating' balers; and 'packing', 'linear', or 'rectangular' balers. These basic designs have existed since the turn of the century. Improvements in agricultural machinery have been based on refinements of these designs. In one method, the bale can be formed rolling the material into a cylinder via a tensioned belt on one or more sides of a drum. The final bale dimensions being the dimensions of the drum. The density can be set variously by the tension on the belts, or the amount of material fed into the drum, after which the rolling ceases and the bale is ejected. In another method, the bale can be formed by packing the material via a plunger into a chamber. The final bale being the dimensions of the chamber at the end of the stroke of the plunger (most likely to form a cube or cylinder). The density being set by the amount of material fed in and the length of the stroke of the plunger. Other methods include, by way of example, twisting the material to form a rope, which is then cut to form the bales, and rolling a pre-measured or pre-cut amount of the material between two surfaces to form a ball.

The bales may contain a second material mixed with the primary fibrous material for additional comfort or thermal properties, and/or may be wrapped in such a second material (e.g. tissue paper). The material to be baled, including the shredded paper in this case, has a number of difficult characteristics. In particular, it is of unpredictable length, and it is of unpredictable tightness prior to baling and may be more or less cohesive as a result. In agricultural situations, balers typically pick material from the ground and feed it into the baling chamber. Typically this would be achieved by rotating or linear tines. Tines allow the baler to pick up a variety of materials, and in the case of rotating tines may also cut it into shorter lengths. After the initial collection of the material, further feeding of the material into the baling chamber may be achieved by an augur, conveyer, or further linear actuating tines. This process tends to tease apart the material prior to baling. In the current application, material will be fed to the baler on a conveyer of some kind, and ideally dropped into a gravity-fed holding chamber for uptake into the baling chamber. To control the weight of each bale, the feed mechanism can tease the material to a consistent density, or deliver set weights of material to the baler for each baling cycle.

In a rolling baler, the material is fed into a drum, where tensioned belts arranged around a portion of the drum spin the material against the sides of the drum. As more material is added, the tensioners in the belt allow it to deform to accommodate the growing bale. The change in tension in the belt and positing of the belt rollers indicate the size of the bale. The density of the bale can be adjusted by adjusting the tension of the belts during the baling process. Once the bale has reached the desired diameter, the bale may be ejected directly, or a secondary material fed into the baler to wrap and seal the bale. The resulting bale can take the form of the bale shown in FIG. 3a-3d.

A rotating baler has distinct pros and cons in this application. Key advantages include: A relatively simple feed mechanism. Of particular use in this application, the conveyer and the belt inside the baling mechanism could be one and the same, allowing for a smooth feed of material into the baling chamber. As material is added gradually, the weight of material can be potentially controlled by directly weighing the baling chamber. Any secondary wrapping of the finished bale is relatively easily achieved by feeding a second material into the same mechanism. The cylindrical bales are potentially easier to feed through secondary dispensing systems (because they can roll).

Key disadvantages of a rotating baler include: The baling mechanism itself is relatively complex. In particular many moving parts are in contact with the difficult-to-work-with material to be baled. The whole baling chamber must open to eject the finished bale. This adds a considerable time cost to the production cycle for each bale, and is a serious drawback for such balers in agricultural settings. It adds additional complexity to the mechanism. It requires the feed mechanism to stop and start, which has obvious disadvantages for a production-line implementation ideal for the current application. Coordinating all of these actions requires much more complex sensing, actuators, and control than a packing baler.

Figure 4A:
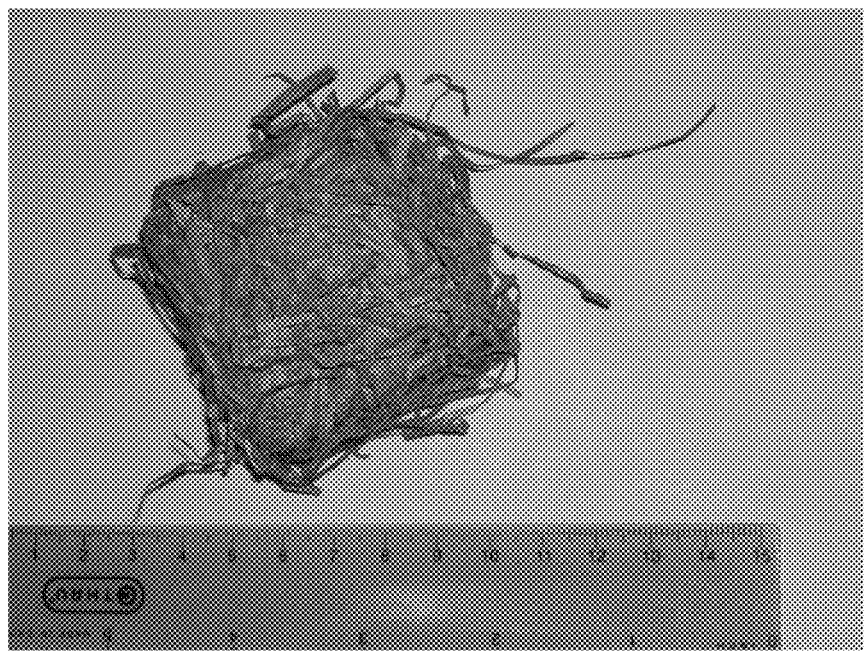
FIG. 4a is a top view of a 'packed' bale, formed by compressing the scaffolding material in a square chamber. The bale is about 1.5 cm thick. The scale is in cm.
Figure 4B:
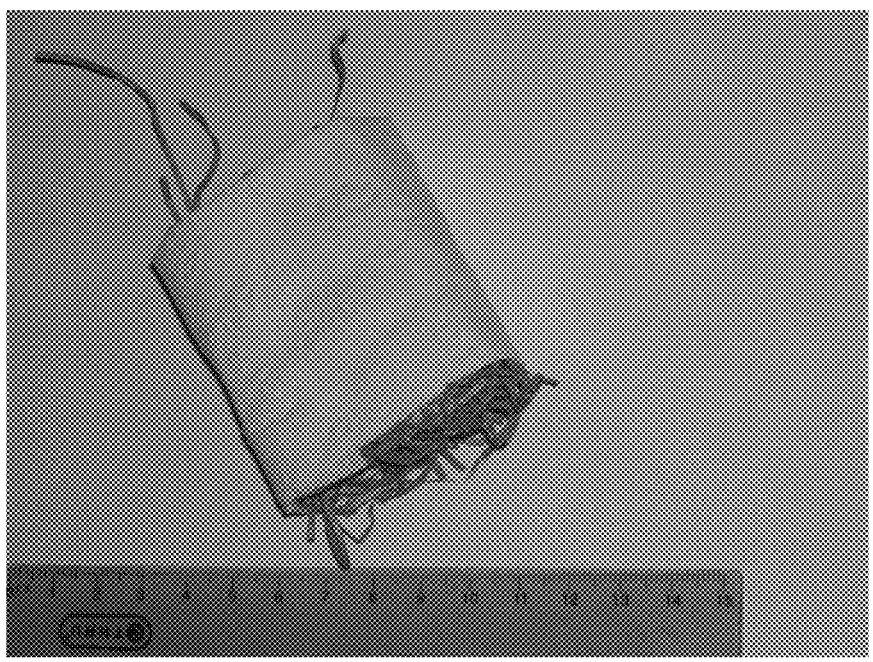
FIG. 4b is a top view of the packed bale shown in FIG. 4a with the addition of four layers of tissue paper (the same lengthwise amount as in the rolled bale in FIG. 3c). The scale is in cm.

In a packing baler, material is fed into the baling chamber from a 'holding area' (typically by linear tines). A Plunger then moves down the chamber, closing the feed entrance, compressing the bale against the end of the chamber. The back of the chamber then opens, and further mechanisms (or the plunger) eject the bale. As the plunger retracts the back of the chamber closes again, the entrance opens, and the cycle begins again. The bales formed by such a mechanism are illustrated in FIGS. 4a and 4b. Typically this system is entirely mechanical, and is achieved by operating all the elements from the same drive train. In agricultural machinery, where large forces are required, a flywheel is usually included in the drive train to store and maximize mechanical power. In agricultural machinery, the ejected bale is then tied in a secondary mechanism, and ejected from the entire assembly. In the current application if the bale is to be wrapped in a secondary material, this would occur at this point in a secondary mechanism.

Key advantages of using a packing bailer in this application include: The entire mechanism can be driven by simple reciprocating cams on the same gear train, ensuring perfect timing; or may be driven using individual motors and actuators coordinated by electronics or computer. The action of the baler is continuous, avoiding the need to stop-and-start the feed mechanism. Ejection of the bale is mechanically simple. Volume (and indirectly density) of the bale is easily controlled by the depth of stroke of the plunger.

Key disadvantages of using a packing bailer in this application include: Secondary wrapping of the bale is potentially more complex. Control of the weight of material entering the baling chamber is more difficult, as the system in its simplest mechanical embodiment reciprocates at a constant rate, and bales a constant volume of material. This problem is potentially overcome by weighing the material in the holding area, and initiating a baling cycle once a given weight is achieved (which would require sensor driven actuators, rather than a reciprocating system). Alternatively the feed mechanism could in other ways ensure that a constant weight per unit time of material is delivered.

Figure 5A:
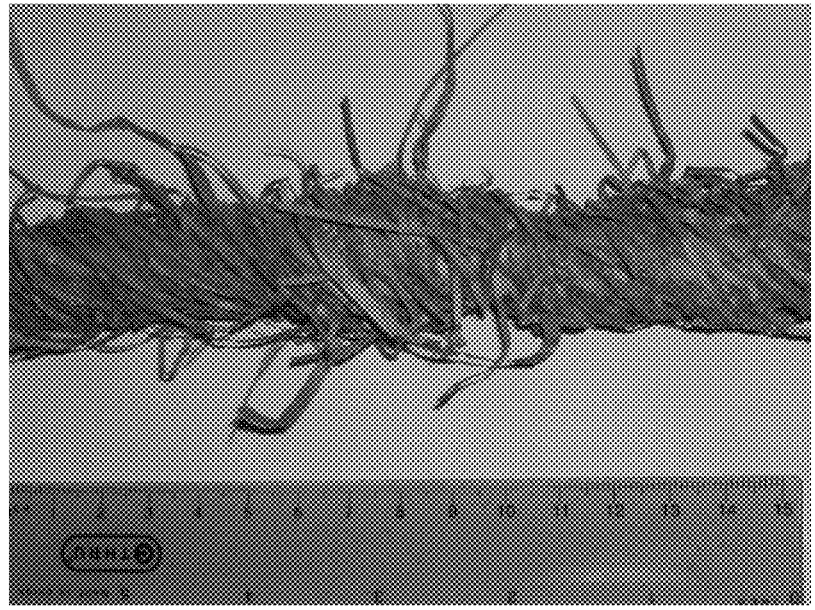
FIG. 5a is an elevation view of a 'twisted' bale, formed by twisting the scaffolding material to form a rope. The scale is in cm.
Figure 5B:
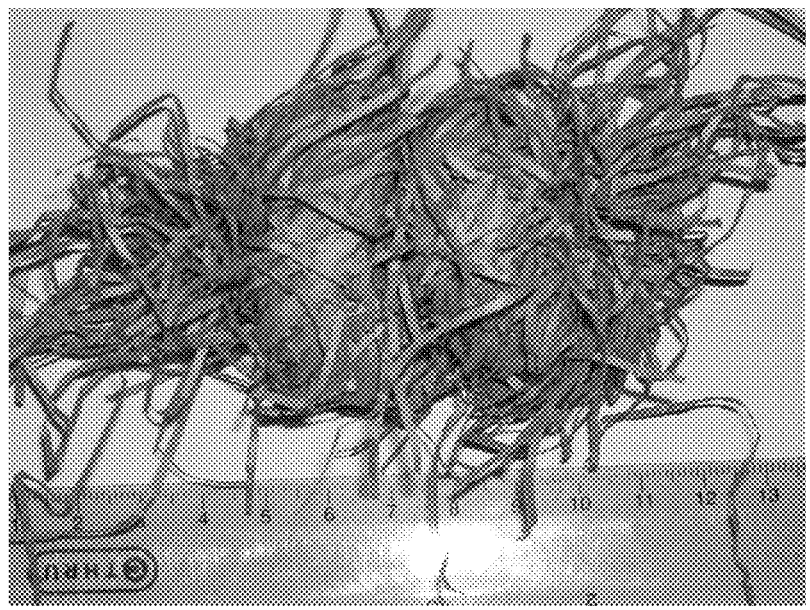
FIG. 5b is an elevation view of a helical bale formed using the same length of rope as shown in FIG. 5a further twisted to form the helical bale. The scale is in cm.
Figure 6:
FIG. 6 is a model nest made using the materials in the bales in FIGS. 3 and 4. The scale is in cm.

Using a twisting bailer, the material is fed into the baler where it is twisted to form a rope as shown in FIG. 5a, which may or may not be further twisted to form a helical bale as shown in FIG. 5b. The resulting 'rope' can then be cut into standard sizes to accommodate a standard weight and volume. The density of the bale can be controlled by the tightness of the twisting mechanism in either forming the rope or forming a secondary helical bale. Secondary materials can be included in the initial mixture entering the baler, or can be wrapped around the initial bale (as with the other systems).

Twisting of the material can be achieved by drawing the material into the baler between rollers that then feed to diagonally oriented rollers that draw the material forward and also rotate it along the longitudinal axis of the rope. Twisting by a draw (pull) mechanism (as is used in manufacturing ropes) will not be possible given the fact that the initial material is easily separated into individual relatively short fibers. Secondary twisting to form a helical bale could be performed by a draw (pull) mechanism similar to that used in conventional rope manufacture.

Key advantages of using a twisting bailer include: The action of the baler is continuous, avoiding the need to stop-and-start the feed mechanism. Ejection of the bale is mechanically simple. Key disadvantages include: Secondary wrapping of the bale is potentially more complex. The resulting bales are potentially less uniform and more difficult to handle in secondary automated mechanisms. The baling mechanism will be mechanically complex, and many moving parts will be in contact with the difficult-to-handle material.

The bales may be dispensed into mouse cages by hand, or by an automatic system (such as a conveyer, or pneumatic delivery) integrated with existing automated bedding dispensers (either at cage wash or cage change). In smaller facilities, cages are usually prepped after cleaning with fresh bedding by hand. At this point bales could be provisioned to cages manually. The current invention makes manual provision for nesting enrichment far simpler because nesting material does not need to be handled, weighed or otherwise prepped prior to placement in the cage.

Nevertheless, the greatest advantage of the current application is that it allows the provision of bales to be automated. In larger facilities, cages are provisioned with bedding material automatically, either as part of the automated line exiting the cage washer; or at an automated cage prep station outside of the animal room; or at a cage change station in the animal room. The uniform size and shape of the bales allows easy integration with such automated systems via a variety of general mechanisms. For example, cylindrical bales (either rolled or packed), especially if wrapped, are easily dispensed via a gravity fed system, where bales are loaded into a hopper, which funnels down to a channel that orders bales one after another, and a simple gate mechanism drops one bale at a time; or a plunger mechanism eject one bale at a time perpendicular to the gravity feed.

Alternatively cylindrical or rectangular bales can be loaded in a gravity fed line and ejected by a similar gate or plunger mechanisms. Alternatively bales can be delivered by a conveyer system. Such systems can snake vertically to allow the storage and conveyance of a large number of bales in a compact space. Preferably, the bales will be packaged in such a way that a larger package of bales loads directly into the delivery system, minimizing any manual sorting or loading of the bales.

From the forgoing description of the structure and operation of preferred embodiments, it will be apparent to those skilled in the art that the present invention is susceptible to numerous modifications and embodiments within the ability of those skilled in the art and without exercise of the inventive facility. Accordingly, the scope of the present invention is defined as set forth of the following claims.

What is claimed is:

1. A standardized nesting material for use in laboratory environments for rodents comprising: a latrining substrate, and at least one bale unit, wherein the bale unit is in the form of a twisted rope, formed to include a plurality of fibrous scaffolding materials bound by an insulating material wrapped about an outer surface of the plurality of fibrous scaffolding materials, wherein an outer surface of the bale comprises an exposed surface of the plurality of scaffolding materials forming a portion of the outer surface of the bale and a surface of the insulating material forming a remainder of the outer surface of the bale.

2. The standardized nesting material of claim 1, wherein the latrining substrate comprises corn cob particulate.

3. The standardized nesting material of claim 1, wherein the plurality of fibrous scaffolding materials comprises shredded paper.

4. The standardized nesting material of claim 1, wherein the insulating material comprises tissue paper.

5. The standardized nesting material of claim 1, wherein the insulating material is situated on the outside of the plurality of scaffolding materials.

6. The standardized nesting material of claim 1, wherein the bale unit is further twisted to form a helical bale.

7. The standardized nesting material of claim 1, wherein the bale unit is in the form of a doubly twisted rope.

8. A standardized nesting material for use in laboratory environments for rodents comprising: a latrining substrate, and at least one bale unit formed to include a plurality of fibrous scaffolding materials bound by an insulating material wrapped about an outer surface of the plurality of fibrous scaffolding materials, wherein the bale unit is in the form of a twisted rope, and wherein the insulating material completely surrounds the outer surface of the plurality of scaffolding materials, and wherein the latrining substrate comprises corn cob particulate.

9. The standardized nesting material of claim 8, wherein the exposed surface of the plurality of scaffolding materials comprises two separate exposed surfaces of the plurality of scaffolding materials positioned on opposing sides of the bale.

10. A standardized nesting material for use in laboratory environments for rodents comprising: a latrining substrate, and at least one bale unit formed to include a plurality of fibrous scaffolding materials bound by an insulating material wrapped about an outer surface of the plurality of fibrous scaffolding materials, wherein the bale unit is in the form of a twisted rope, and wherein the insulating material completely surrounds the outer surface of the plurality of scaffolding materials, and wherein the insulating material comprises tissue paper.

* * * * *